United States Patent
Colella

(10) Patent No.: US 9,349,305 B2
(45) Date of Patent: *May 24, 2016

(54) TEXTURED HEAT TRANSFER LABEL

(71) Applicant: Illinois Tool Works Inc., Glenview, IL (US)

(72) Inventor: Michael B. Colella, Southington, CT (US)

(73) Assignee: Illinois Tool Works Inc., Glenview, IL (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/903,385

(22) Filed: May 28, 2013

(65) Prior Publication Data

US 2014/0193609 A1    Jul. 10, 2014

Related U.S. Application Data

(63) Continuation-in-part of application No. 13/736,231, filed on Jan. 8, 2013.

(51) Int. Cl.
| | |
|---|---|
| *B41M 5/382* | (2006.01) |
| *B41M 5/40* | (2006.01) |
| *B32B 37/06* | (2006.01) |
| *B44C 1/16* | (2006.01) |
| *B44C 1/17* | (2006.01) |

(Continued)

(52) U.S. Cl.
CPC . *G09F 3/04* (2013.01); *B32B 37/06* (2013.01); *B41M 5/38214* (2013.01); *B41M 5/405* (2013.01); *B44C 1/162* (2013.01); *B44C 1/1712* (2013.01); *B41M 2205/12* (2013.01); *G09F 2003/0211* (2013.01); *Y10T 428/24355* (2015.01)

(58) Field of Classification Search
CPC .... B41M 5/38214; B41M 5/382; B41M 5/40; B41M 5/405; B41M 2205/12; B05D 3/067; B05D 5/02; B44C 1/162; B44C 1/1712; B44C 1/16; B44C 1/17; B32B 37/06; G09F 3/04; G09F 2003/0211
USPC ............ 428/32.79; 427/152, 258, 385.5, 511, 427/558; 156/240
See application file for complete search history.

(56) References Cited

U.S. PATENT DOCUMENTS

| | | |
|---|---|---|
| 5,281,290 A | 1/1994 | Bosler |
| 5,919,834 A | 7/1999 | Downs et al. |

(Continued)

FOREIGN PATENT DOCUMENTS

| | | |
|---|---|---|
| EP | 1886837 A1 | 2/2008 |
| JP | H10 157399 A | 6/1998 |
| WO | 0181080 A1 | 11/2001 |

(Continued)

OTHER PUBLICATIONS

International Search Report for PCT/US2014/033358, dated Aug. 7, 2014.

(Continued)

*Primary Examiner* — Bruce H Hess
(74) *Attorney, Agent, or Firm* — Levenfeld Pearlstein, LLC

(57) ABSTRACT

A textured heat transfer label includes a textured portion formed from a highly cross-linked UV ink and a thermoplastic background ink. The textured heat transferable label can also include metalized portions.

9 Claims, 5 Drawing Sheets

(51) Int. Cl.
*G09F 3/04* (2006.01)
*G09F 3/02* (2006.01)

(56) References Cited

U.S. PATENT DOCUMENTS 6,909,444 B2 * 6/2005 Ishida et al. .................. 347/187
7,910,203 B2    3/2011 Colella et al.

FOREIGN PATENT DOCUMENTS

WO    2006108611 A2    10/2006
WO    2013141987 A2     9/2013

OTHER PUBLICATIONS

International Preliminary Report on Patentability for PCT/US2013/026597, dated Sep. 23, 2014.

* cited by examiner

TEXTURED HEAT TRANSFER LABEL

CROSS-REFERENCE TO RELATED APPLICATION DATA

This application is a continuation-in-part and claims the benefit of U.S. patent application Ser. No. 13/736,231, filed Jan. 8, 2013, the disclosure of which is incorporated by reference in its entirety.

BACKGROUND

The present disclosure generally relates to heat transfer labels, and more particularly to textured heat transfer labels.

Heat transfer labels are well known and used in various industries. For example, heat transfer labels are used to transfer indicia onto goods including consumer items ranging from cell phone cases to golf club shafts. Typically, heat transfer labels include thermoplastic color layers capable of being adhered to substrates upon application of heat and pressure.

It is of utmost importance that the indicia or marking transferred to the item is of a high quality. In many instances, the item is one that is intended to be used for a long period of time. For example, cellular telephones are intended to last for at least a number of years, as are golf clubs. To this end, the printed indicia (e.g. the manufacturer's name, trademark or the like) should be long-lasting, difficult to abrade and resistant to chemical environmental degradation.

UV curing heat transfer labels are also known. UV curing heat transfer labels can provide advantages over solvent-based or water-based thermoplastic ink systems since they do not emit volatile organic compounds and they exhibit improved abrasion resistance and chemical resistance. Such UV curing heat transfer labels are disclosed in Downs et al., U.S. Pat. No. 5,919,834, which is commonly assigned with the present application and incorporated in its entirety by reference.

Further, it is desirable in some applications that the label has a metallized finish section once the label is applied to the goods. Various techniques to achieve the desired metallized effect are available. An example of a selectively metallized heat transfer label is disclosed in Colella et al., U.S. Pat. No. 7,910,203, which is commonly assigned with the present application and incorporated in its entirety by reference.

Additionally, textured labels having a raised surface may be desired for some applications. A heat transfer label with a textured feel can be produced by using an embossed carrier. Such a label is produced by printing on a carrier film which has been embossed with the pattern that one would like to transfer to the item being decorated. However, such textured labels require an embossing process step, which can increase production costs (e.g. embossing tooling and added production step.)

Accordingly, there is a need for an improved textured heat transfer label, which may also include selectively metallized portions.

BRIEF SUMMARY

Textured heat transfer labels according to various embodiments provide a label including textured portions according to desired designs that can be transferred to a substrate upon application of heat and pressure.

In one aspect, a textured heat transfer label includes a carrier, a background layer, and a textured layer formed of a cross-linked polymer. The background layer is configured to transfer and adhere to a substrate upon application of heat and pressure, and the textured layer is configured to remain bonded to the background layer providing a raised textured surface.

In another aspect, a heat transfer label includes a carrier, a metallized portion, a textured portion, and a background layer. The background layer is configured to transfer and adhere to a substrate upon application of heat and pressure, and the metallized portion and the textured portion are configured to remain bonded to the background layer after the heat transfer label is transferred to the substrate.

In yet another aspect, a heat transfer label includes a carrier, a background layer, and a textured portion which includes a metalized layer. The background layer is configured to transfer and adhere to a substrate upon application of heat and pressure, and the textured portion with the metalized layer is configured to remain bonded to the background layer providing a metallized textured surface.

In one aspect, a method of making a textured heat transfer label is provided. The method includes the steps of printing a textured layer on a carrier, curing the textured layer, and printing a background layer over the cured textured layer on the carrier.

In another aspect, a textured heat transfer label including a carrier, a textured layer, and a background layer is provided. The textured layer is disposed on the carrier, and includes a raised portion and an unprinted portion, in which the unprinted portion defines a graphic pattern. The background layer is disposed over the textured layer, and configured to transfer and adhere to a substrate upon application of heat and pressure. The textured layer is configured to remain bonded to the background layer to provide a raised textured surface.

In one embodiment, the background layer is formed from a thermoplastic ink. In another embodiment, the raised portion is formed of a cross-linked polymer. For example, the raised portion can be formed of a cross-linked UV curable ink. In an embodiment, the raised portion is defined by a strip of printed area including the unprinted portion, which defines the graphic pattern.

The background layer is configured to soften and become tacky when subjected to heat and pressure. An adhesion between the background layer and the substrate is greater than that between the background layer and the carrier when subjected to heat and pressure. Further, an adhesion between the textured layer and the background layer is greater than an adhesion between the textured layer and the carrier when subjected to heat and pressure.

In some embodiments, the carrier includes a release layer, in which the textured layer and the background layer are applied on the release layer.

In yet another aspect, a method of making a textured heat transfer label is provided. The method includes the steps of printing the textured layer including a raised portion and an unprinted portion on a carrier, curing the textured layer, and printing a background layer over the cured textured layer on the carrier.

In an embodiment, the step of printing the textured layer includes printing a strip of a UV curable ink including the unprinted portion, in which the raised portion is defined by the strip of UV curable ink on the carrier, and a graphic pattern is defined by the unprinted portion in the strip of UV curable ink. The step of printing the textured layer can include applying multiple passes of a UV curable ink to achieve a desired height of the raised portion. Further, the step of curing the textured layer can comprise exposing the printed textured layer to a UV light source.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
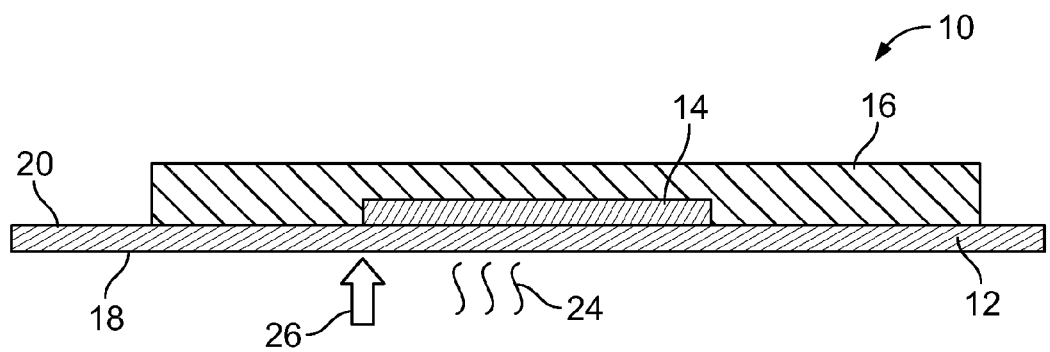
FIG. 1 is a schematic cross sectional view of a textured heat transfer label according to an embodiment.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated. The words "a" or "an" are to be taken to include both the singular and the plural. Conversely, any reference to plural items shall, where appropriate, include the singular.

Figure 2:
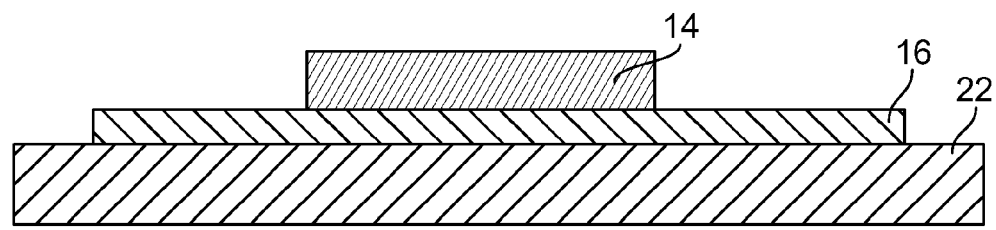
FIG. 2 is a schematic cross sectional view of the textured heat transfer label of FIG. 1 applied on a substrate.

Referring now to the figures, FIG. 1 shows a schematic cross sectional view of an embodiment of a textured heat transfer label 10. Layer thicknesses are exaggerated for easy understanding and are not proportional. The textured heat transfer label 10 generally includes a carrier 12, a textured layer 14, and a background layer 16. The heat transfer label 10 is configured such the background layer 16 transfers and adheres to a target object 22 (FIG. 2) with the textured layer 14 when heat 24 and pressure 26 are applied on an outer surface 18 of the carrier 12. When applied on the object 22, the textured layer 14 provides a raised surface feature, which provides a textured appearance and feel on the surface of the object 22 as shown in FIG. 2.

Thus, the textured layer 14 is formed from a material that can withstand the heat and pressure required for transferring the label 10 to the object 22, and retain the raised texture feature. Preferably, the textured layer 14 is formed from a UV curable ink that is highly cross-linked when cured. The UV curable ink can be prepared by dissolving a thermoplastic resin in a monomer, an oligomer, or a monomer/oligomer mixture, and incorporating into a finished photoinitiated ink system. It should be understood that any monomer, oligomer, or monomer/oligomer mixture which can dissolve the thermoplastic resin component and remain compatible with the other components of the labels are acceptable. Suitable monomers for dissolving the thermoplastic resin component include esters of acrylic acid and methacrylic acid such as lauryl acrylate, isobornyl acrylate, 2-phenoxyethyl acrylate, glycidyl methacrylate, tetraethoxylated nonylphenol acrylate, and propoxylated neopentyl glycol diacrylate.

Thermoplastic resins suitable for the UV curable ink include epoxies, polyurethanes, polymethacrylates, polyethylene vinyl acetates, polyvinyl chlorides, vinyl chloride/vinyl acetate copolymers, functionalized vinyl chloride/vinyl acetate copolymers, chlorinated halogenated polyolefins such as chlorinated and fluorinated polyolefins, and polystyrene.

Additionally, thermoplasticity (i.e. adhesion) can be promoted by preparing a coating made from monofunctional acrylates. Oligomers can be added to improve the physical and chemical properties of the finished coating.

Suitable photocurable monomer initiators include benzophenone, alpha ketone, thiophenyl morpholinopropanone (Irgacure® 907), morpholinophenylaminohexanone (Irgacure® 369), cyclohexylphenyl ketone (Irgacure® 184), hydroxyphenylpropanone (Darocur® 1173), and isopropylthioxanthone (Darocur® ITX), alkylated benzophenone (Esacure® TZT), diphenyl(2,4,6-trimethylbenzoyl)phosphine oxide (Genocure® TPO), and poly 4-(2-hydroxy-2-methylpropionyl) alpha-methyl styrene (Escacure® KIP-100F). Irgacure® 907, 369, 184, Darocur® 1173, and Darocur® ITX are products available from BASF. Genocure® TPO is a product of RAHN. Generally, suitable initiators are those which produce free radicals upon exposure to UV radiation.

UV curable ink formulations similar to those disclosed in the aforementioned Downs et al., which is incorporated herein in its entirety by reference, can be used to print the textured layer 14. Preferably, the textured layer 14 is formed using a highly cross-linked UV ink, thus, preferred formulations include more initiator or cross-linking agent than the formulations disclosed in U.S. Pat. No. 5,919,834. The UV ink formulations in U.S. Pat. No. 5,919,834 are formulated to be heat transferable inks, while UV ink formulations for the textured layer 14 need not be heat transferable since the textured layer 14 remains bonded to the background layer 16 upon application of heat and pressure. Preferably, the UV curable ink formulations for the textured layer 14 are formulated such that the ink retains its solid form after curing via a suitable UV light source and does not soften when subjected to heat and pressure, such that its raised texture design is retained after the background layer 16 is transferred to the target object 22 with the textured layer 14.

Curing of the UV curable ink can be effected by exposing the ink to a suitable UV source, such as a Fusion Systems light source, using either a doped mercury type "D" or "V" lamp. The "D" outputs in the wavelength range of 340-390 nm. The "V" lamp outputs in the 400-430 nm. range. The choice of pigment and initiator dictate which range (i.e. lamp) to use, and the selection process would be readily understood by the artisan skilled in printing with traditional UV curing inks.

In one embodiment, the textured heat transfer label 10 is made by printing a first pass of a UV curable ink on the carrier 12. This first pass is printed in a design that a user wished to have appear as a raised structure on a decorated object. This pass of the UV curable ink is exposed under a suitable UV light source, which cures or cross links the UV curable ink into the textured layer 14 formed of a highly cross-linked UV ink. The first pass is followed by at least one more print pass over the cross-linked ink. This second pass of ink forms the background layer 16, which has good intercoat adhesion to the cross-linked UV ink as well as sufficient affinity to the object 22 being decorated, such that the background layer 16 can be transferred to the object 22 with the textured layer 14 when subject to heat and pressure. The second pass of ink is preferably a thermoplastic ink, such that the background layer 16 softens and transfers and bonds to the object 22 when subjected to heat and pressure.

Suitable thermoplastic inks for the background layer 16 include, but are not limited to, epoxies, polyurethanes, polymethacrylates, polyethylene vinyl acetates, polyvinyl chlorides, vinyl chloride/vinyl acetate copolymers, functionalized vinyl chloride/vinyl acetate copolymers, chlorinated halogenated polyolefins such as chlorinated and fluorinated polyolefins, and polystyrene.

The carrier layer 12 can be formed of a paper or plastic film. A polyester film is preferred because, at least as compared to some other plastic materials like polyethylene and non-oriented polypropylene, polyester possesses more favorable mechanical properties and offers a more suitable surface for printing the textured layer 14 and the background layer 16. In addition, unlike polyethylene, polyester does not tend to soften and become tacky at the ranges of temperatures typically encountered during transfer of label 10 to the object 22.

In one embodiment, the carrier 12 is formed from a 92 gauge (92 ga) clear, untreated packaging grade polyester film as is well known in the art. As can be readily appreciated, one benefit of using a clear material for carrier layer 3 is that, if desired, one can inspect the quality of the subsequent printed layers of label 10 by looking at the layers through the carrier 12.

The material for the carrier 12 is selected such that surface energy for the carrier 12 is sufficiently high, such that the ink for the textured layer 14 and the ink for the background layer 16 can be printed on the carrier 12. However, the surface energy of the carrier 12 is configured such that the textured layer 14 and the background 16 can be released from the carrier 12 and transfer to the object 22 when subjected to heat and pressure. Thus, in the textured heat transfer label 10, adhesion between the textured layer 14 and the background layer 16 is greater than adhesion between the carrier 12 and the textured layer 14 or adhesion between the carrier 12 and the background layer 16. Further, adhesion between the background layer 16 and the object 22 upon application of heat and pressure is greater than adhesion between the carrier 12 and the textured layer 14 or adhesion between the carrier 12 and the background layer 16.

In some embodiments, a layer of a release material is provided on an inner surface 20 of the carrier 12 to facilitate a clean separation of the background layer 16 and the textured layer 14 from the carrier 12.

Figure 3:
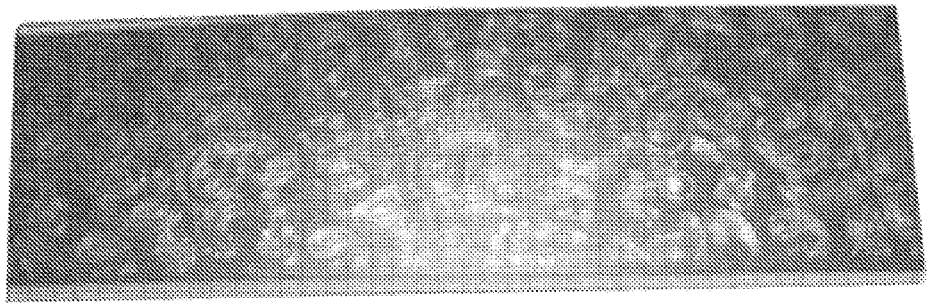
FIG. 3 is a photograph of an example of a textured heat transfer label including a textured paisley pattern.
Figure 4:
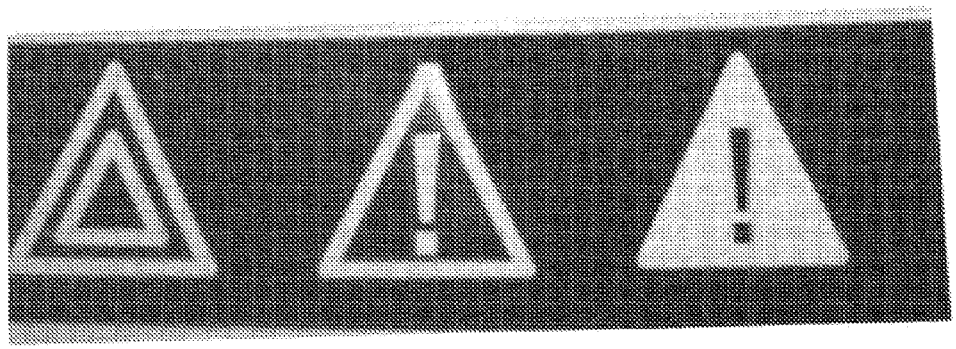
FIG. 4 is a photograph of another example of a textured heat transfer label.

For some applications, multiple passes of different color inks and designs can be printed to produce a multicolored graphic. Further, the UV curable ink can be printed in multiple passes to yield a label with a higher raised textured layer. The UV curable ink can be clear or pigmented, which gives rise to different effects. FIG. 3 is a photograph of a sample textured heat transfer label applied on a flat substrate. As shown, the sample includes raised paisley patterns. This textured heat transfer label was prepared by first printing the paisley patterns with a clear UV curable ink and curing it by passing the printed ink under a UV light source. Subsequently, a block of silver thermoplastic ink was printed on top of the cured UV ink. When transferred onto the substrate by heat and pressure, the label provides an embossed look and feel of the decorated part. FIG. 4 is a photograph of a sample of a different textured heat transfer label applied on a substrate. This label was prepared by printing a white UV curable ink and curing it for the textured layer, then printing a black thermoplastic ink as the background layer. This label provides for a visual color differentiation as well as a textured feel from the graphics printed in white having a raised surface as compared to the background layer.

The textured layer 14 may be printed using a thermoplastic ink. However, such a textured layer results in a very slightly raised surface, one that is much less pronounced than that printed with a UV curable ink. This is because the textured layer 14 formed using a thermoplastic ink, which is not cross-linked, can become soft and flatten out under heat and pressure. As such, edges of an image printed using a thermoplastic ink tend to be less sharp and not as well defined than those formed using a cross-linked UV ink. The textured layer 14 can also be formed from other types of cross-linkable inks (i.e., does not have to be a UV curable ink), which can retain a printed design when subjected to heat and pressure. However, UV curable inks are preferred because most of the printed ink stays as printed to retain the height of the printed design, whereas images printed using a solvent based or water based ink will lose height as the solvent (or water) portion of the ink is driven off when dried.

Figure 9:
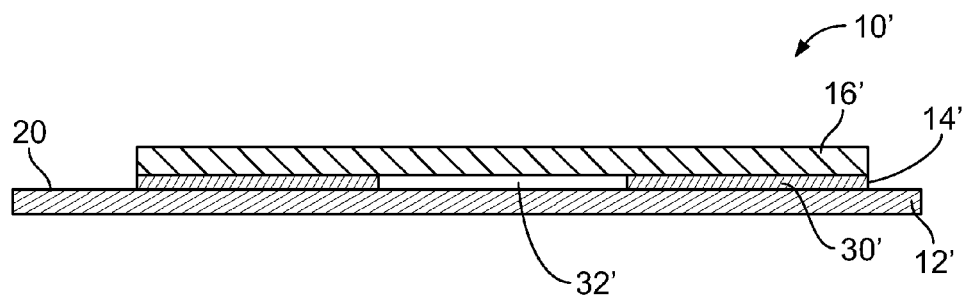
FIG. 9 is a schematic cross sectional view of a textured heat transfer label including a negative pattern according to an embodiment.

FIG. 9 is a schematic cross sectional view of another embodiment of a textured heat transfer label 10'. Layer thicknesses are exaggerated for easy understanding and are not proportional. The textured heat transfer label 10' is configured similar to the textured heat transfer label 10 of FIG. 1, and generally includes a carrier 12', a textured layer 14' including raised portions 30' and unprinted portions 32', and a background layer 16'. In this embodiment, a graphic pattern or design in the textured layer 14' is defined by the unprinted portions 32'. The graphic pattern, which is defined by the unprinted portions, 32' is also referred herein as a "negative pattern."

In one embodiment, a solid band or strip of the raised portion 30' is printed on the carrier 12' using a suitable ink, in which the negative graphic pattern is left as unprinted portions 32'. Suitable materials discussed above with regard to the textured layer 14 of the embodiment of FIG. 1 are also suitable for the textured layer 14'. For example, a UV curable ink can be used to form the raised portion 30' via a suitable printing method. A single print pass or multiple print passes can be applied to achieve a desired thickness of the raised portion 30'. The textured layer 14' formed from a UV curable ink is subsequently cured or cross-linked under a UV source.

The background layer 16' is applied over the textured layer 14'. Suitable materials discussed above with regard to the background layer 16 of the embodiment of FIG. 1 are also suitable for the background layer 16'. For example, the background layer 16' may be formed using a thermoplastic heat activated adhesive having a good adhesion to a target substrate. In some embodiments, the textured heat transfer label 10' may include additional layers. For example, a backer layer and/or other colored or clear layers (not shown, but will be understood by those skilled in the art) may be printed over the textured layer 14', such that the such additional layer is disposed between the textured layer 14' and the background layer 16'. Further, textured heat transfer label 10' may also include a metallized layer or a layer including a metallized portion (also not shown, but will be understood by those skilled in the art.)

To apply the textured heat transfer label 10' to a substrate, the textured heat transfer label 10' is place on a substrate, such that the background layer 16' faces the substrate. When heat and/or pressure are applied on the carrier 12', the background layer 16' softens and adheres to the substrate. Subsequently, the carrier 12' is removed, and since the adhesion between the background layer 16' and the textured layer 14' is greater than that between the textured layer 14' and the carrier 12', the textured layer 14' remains attached to the background layer 16' and transfers to the substrate.

Figure 10:
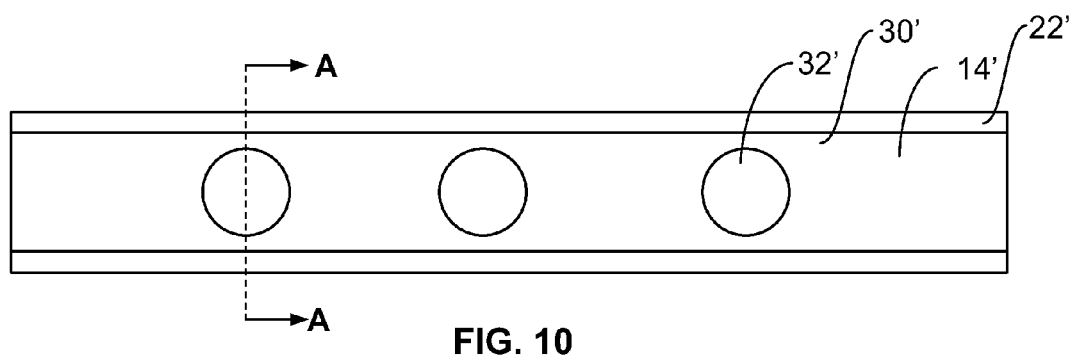
FIG. 10 is a perspective top view of a textured heat transfer label including a negative pattern applied on a substrate according to an embodiment.
Figure 11:
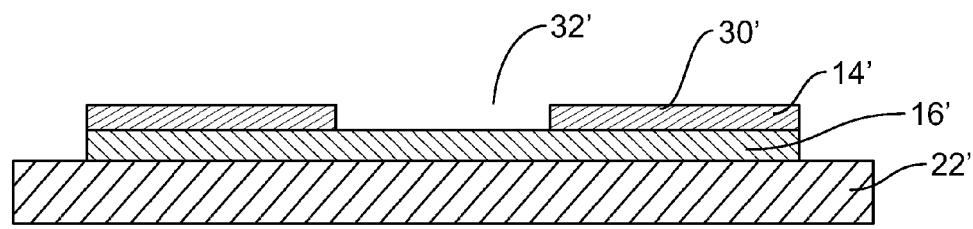
FIG. 11 is a schematic cross sectional view of the textured heat label on the substrate of FIG. 10 taken along line A-A.

FIGS. 10-11 show the textured layer 14' and the background layer 16' transferred and attached to a substrate 22' according to an embodiment. FIG. 10 is a perspective top view of the textured area 14' and the background layer 16' on the substrate 22', and FIG. 11 is a cross sectional view of the embodiment of FIG. 10 taken along line A-A. As shown, a band of raised portion 30' is formed using UV curable ink, and circular graphic patterns 32' are defined by unprinted areas. Such graphic patterns formed as a negative pattern on a band of raised portion can provide an embossed look to a label.

Figure 5:
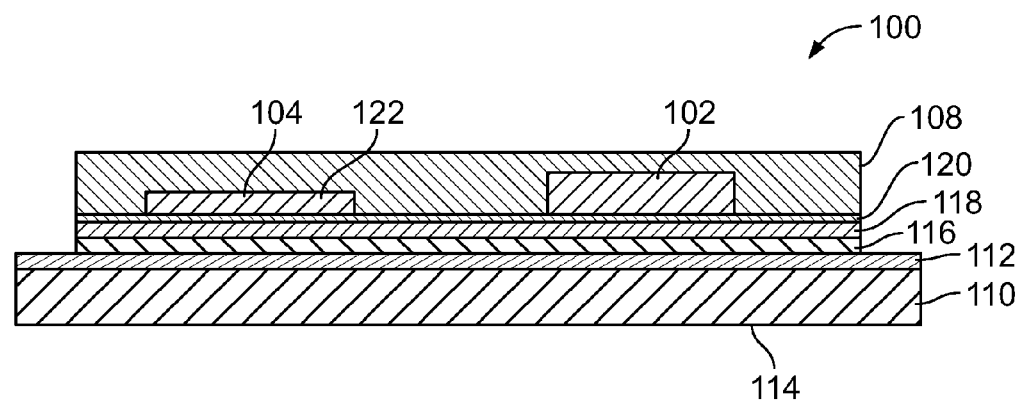
FIG. 5 is a schematic cross sectional view of a heat transfer label including a metallized portion and a textured portion according to an embodiment.
Figure 6:
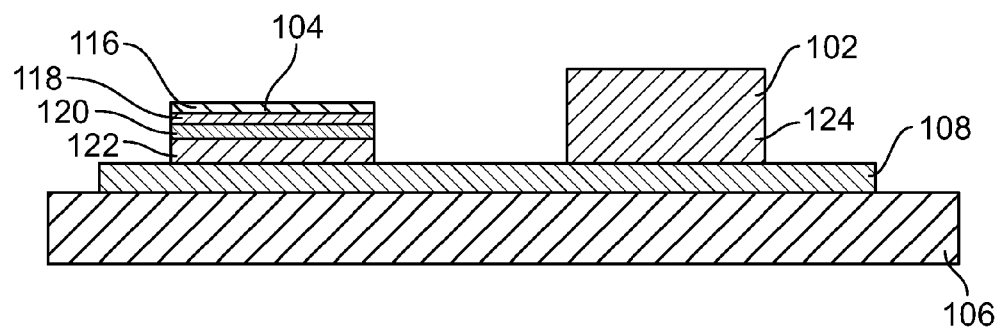
FIG. 6 is a schematic cross sectional view of the heat transfer label of FIG. 5 applied on a substrate.

In some embodiments, a textured heat transfer label can be selectively metallized. FIG. 5 shows a schematic cross sectional view of an embodiment of a heat transfer label 100, which includes a textured portion 102 and a metalized portion 104. FIG. 6 illustrates a schematic cross sectional view of the label 100 heat transferred to a substrate 106. Layer thicknesses of FIGS. 5 and 6 are exaggerated for easy understanding and are not proportional. For example, although the metalized portion 104 is illustrated as a raised surface in FIG. 6, the metalized portion 104 is really only raised very slightly or substantially not raised from a backing layer 108, and if raised, it is much less pronounced than the height of the textured portion 102.

The heat transfer label 100 generally includes the textured portion 102, the metalized portion 104, and the background layer 108 on a carrier 110. The heat transfer label 100 is configured such that the background layer 108 transfers and adheres to the target object 106 (FIG. 6) with the textured portion 102 and the metalized portion 104 when subjected to heat and pressure on an outer surface 114 of the carrier 110. When applied on the object 106, the textured portion 102 provides a raised textured design with textured feel, and the metalized portion provides a metalized design on the surface of the object 106, as shown in FIG. 6.

Referring back to FIG. 5, the carrier 110 includes an optional release layer 112, which facilitates a clean separation of the metalized portion 104 from the carrier 110. In the embodiment shown, a protective layer 116 is applied on the release layer 112, and a metallizable layer 118 is applied on the protective layer 116, and a metal layer 120 is applied on the metallizable layer 118. Further, the heat transfer label 100 includes a tie layer 122, which bonds the metalized portion 104 to the background layer 108, such that the metalized portion 104 can be transferred with the background layer 108 onto the object 106. The heat transfer label 100 also includes a textured layer 124, preferably printed with a UV curable ink as discussed above with regard to the textured heat transfer label 10, forming the textured portion 102. Finally, the background layer 124 is printed over the textured portion 102 and the metalized portion 104 using a thermoplastic ink.

The carrier 110 is a paper or plastic film, as is well known in the prior art. However, a polyester film is preferred because, at least as compared to some other plastic materials like polyethylene and non-oriented polypropylene, polyester possesses more favorable mechanical properties and offers a more suitable surface for printing subsequent layers. In addition, unlike polyethylene, polyester does not tend to soften and become tacky at the types of temperatures typically encountered during transfer of label 100 to a substrate.

In the preferred embodiment, carrier is a 92 gauge (92 ga) clear, untreated packaging grade polyester film as is well known in the art. As can be readily appreciated, one benefit of using a clear material for the carrier 110 is that, if desired, one can inspect the quality of the subsequent printed layers of the heat transfer label 100 (until the application of the metal layer 120, which typically is opaque) by looking at the layers through the carrier 110.

The release layer 112 is optional and formed from a release material that preferably separates cleanly from the metalized portion 102 and is not transferred, to any visually discernible (with the naked eye) degree, to the substrate 106 along with the metalized portion 104. To that end, the release layer 112 is configured to adhere to the carrier 110 more strongly than the protective layer 116 adheres to the release layer 112 when the label 100 is applied to a substrate under heat and pressure. Preferably, the release layer 112 is clear for the same reason the carrier 110 is clear.

In one embodiment, the release layer 112 composition comprises about 0.5%, by weight, cellulose acetate resin (Eastman Chemical Company, Kingsport, Tenn.) dissolved in a solvent mixture of about 4.0%, by weight, diacetone alcohol (Astro Chemicals, Inc., Springfield, Mass.), 47.5%, by weight, ethyl acetate (Ashland Distribution, Dublin, Ohio) and 48.0%, by weight, methyl ethyl ketone (MEK) (Ashland Distribution, Dublin, Ohio). This composition comprises about 0.5% solids and about 99.5% volatile organic compounds (VOCs).

To form the release layer 112, the above described composition is deposited onto the carrier 110, by direct gravure printing using a 360Q cylinder (Pamarco Technologies, Inc., Roselle, N.J.) in the preferred embodiment. After deposition of the release layer composition onto the carrier 110, the VOCs evaporate leaving only the non-volatile components thereof to make up the release layer 112. In the preferred embodiment, the dry coat weight of the release layer 112 is less than 0.05 lbs/3000 sq. ft.

The protective layer 116 typically is a lacquer material designed to provide a chemically and environmentally resistant outer surface to metalized portion 104 of the heat transfer label 100 after it is applied to a substrate. Various such lacquer materials are well known in the prior art.

In the preferred embodiment, the protective layer 116 is configured to adhere to the release layer 112 less strongly than the metallizable layer 118 adheres to the protective layer 116 when the heat transfer label 100 is applied to a substrate under heat and pressure. Additionally, the protective layer 116 preferably is clear to allow the metal layer 120 to be visible once the heat transfer label 100 is applied to a substrate.

Preferably, the protective layer 116 composition comprises about 36.0%, by weight, EPON 1001-B-80 resin solution (comprised of about 80.0%, by weight, phenol, 4,4'-(1-methylethylidene)bis-, polymer with 2,2'-[(1-methylethylidene)bis(4,1-phenylene oxymethylene)]bis[oxirane], and about 20.0%, by weight, MEK)) (Hexion Specialty Chemicals, Inc. Houston, Tex.), about 34.5%, by weight, MEK (Ashland Distribution, Dublin, Ohio), about 22.5%, by weight, Chempol CCP18-3984 hydroxyl functional acrylic polyol (CCP Polymers, Kansas City, Mo.), about 3.0%, by weight, Cymel 303 cross-linking agent (Cytec Industries Inc., West Paterson, N.J.), about 1.6%, by weight, Cycat 4040 catalyst (Cytec Industries Inc., West Paterson, N.J.), about 1.0%, by weight, BYK-310 silicone surface additive (BYK-Chemie GmbH, Wesel, Germany), about 1.0%, by weight, Slipayd SL177 slip agent (TMC Materials, Worcester, Mass.), about 0.2%, by weight, of a mixture of 50.0%, by weight, isopropanol 99% (Ashland Distribution, Dublin, Ohio) and 50.0%, by weight, phosphoric acid 85% (Hubbard Hall, Waterbury, Conn.) and about 0.1%, by weight, of Bentone 34 rheological additive (Rheox, Inc., Heightstown, N.J.). The above composition contains about 49.0%, by weight, solids and about 51.0%, by weight, VOCs.

To form the protective layer 116, the above described composition is deposited onto the release layer 112, by direct gravure printing using a 360Q cylinder (Pamarco Technologies, Inc., Roselle, N.J.) in the preferred embodiment. In the preferred embodiment, after deposition of the protective layer composition onto the release layer 112, the protective layer 116 is cured at a temperature greater than 300° F., causing the VOCs evaporate and leaving only the cured non-volatile components thereof to make up the protective layer 116. In the preferred embodiment, the dry coat weight of the protective layer 116 is about 1.00 lbs/3000 sq. ft.

In some embodiments of the present invention, the protective layer 116 may be omitted if the additional chemical and environmental resistance of the protective layer 116 is not required in a particular application.

The metallizable layer 118 provides a composition and a surface that adheres to the protective layer 116 and to which the metal layer 120 may be readily applied. In the preferred embodiment, the metallizable layer 118 adheres to the protective layer 116 at least as strongly as the metal layer 120 adheres to the metallizable layer 118 when the heat transfer label 100 is applied to a substrate under heat and pressure.

Preferably, the metallizable layer 118 is clear, like the protective layer 116, to allow the metal layer 120 to be visible once the heat transfer label 100 is applied to a substrate. However, in some embodiments, the metallizable layer 118 may be colored. By coloring the metallizable layer 118, when the metal layer 120 is viewed through the metallizable layer 118 after the heat transfer label 100 is applied to a substrate, the apparent color of the metal layer 120 may be altered. For example, if the metal layer 120 has a natural metallic silver color (such as when the metal layer 120 is comprised of aluminum, as in the preferred embodiment), coloring the metallizable layer 118 may make the metal layer 120 appear to have a metallic gold, blue, green, red or other desired metallic color. Compatible pigments and dyes that may be used to color the metallizable layer 118 are known to those skilled in the art, and include automotive grade pigment dispersions (in applications where UV stability is required) and solvent soluble dyes (in applications where UV stability is not required).

In the preferred embodiment, the metallizable layer 118 composition comprises about 65.5%, by weight, MEK solvent (Ashland Distribution, Dublin, Ohio), about 33.0%, by weight, clear base (comprised of about 48.5%, by weight, nitrocellulose in solution (101078 (390-C5-175) from Akzo Nobel, Arnhem, Amsterdam), about 13.0%, by weight, ethyl acetate 99% ester (Ashland Distribution, Dublin, Ohio), about 10.0%, by weight, Cymel 370 resin cross linking agent (Cytec Industries, Inc., West Paterson, N.J.), about 10.0%, by weight, Epon 828 liquid epoxy resin (Hexion Specialty Chemicals, Inc., Houston, Tex.), about 5.0%, by weight, MEK solvent (Ashland Distribution, Dublin, Ohio), about 5.0%, by weight, Cymel U-80 resin (Cytec Industries Inc., West Paterson, N.J.), about 4.5%, by weight, toluene solvent (Ashland Distribution, Dublin, Ohio), about 2.0%, by weight, Uvinul N-3035 (N-35) cyanoacrylate light stabilizer (BASF Corporation, Florham Park, N.J.) and about 2.00%, by weight, Uvinul 3039 (N-539) cyanoacrylate light stabilizer (BASF Corporation, Florham Park, N.J.)), about 1.0%, by weight, of Cycat 4040 catalyst (Cytec Industries Inc., West Paterson, N.J.) and about 0.3%, by weight, of a mixture of 50.0%, by weight, isopropanol 99% (Ashland Distribution, Dublin, Ohio) and 50.0%, by weight, phosphoric acid 85% (Hubbard Hall, Waterbury, Conn.). The above composition contains about 15.0%, by weight, solids and about 85.0%, by weight, VOCs.

To form the metallizable layer 118, the above described composition is deposited onto the protective layer 116, by direct gravure printing using a 360Q cylinder (Pamarco Technologies, Inc., Roselle, N.J.) in the preferred embodiment. In the preferred embodiment, after deposition of the metallizable layer composition onto the protective layer 116, the metallizable layer 118 is cured at a temperature greater than 300° F., causing the VOCs evaporate and leaving only the cured non-volatile components thereof to make up the metallizable layer 118. In the preferred embodiment, the dry coat weight of the metallizable layer 118 is about 0.30 lbs/3000 sq. ft.

The metal layer 120 in the preferred embodiment is comprised of aluminum. To form the metal layer 120, aluminum is deposited onto the metallizable layer 118 by standard resistance metallizing techniques that are well known in the prior art. In the preferred embodiment, the metal layer 120 is deposited to an optical density range of about 2.2 to about 2.5. Additionally, the metal layer 120 is configured to adhere to the metallizable layer 118 at least as strongly as the tie layer 122 adheres to the metal layer 120 when the heat transfer label 100 is applied to a substrate under heat and pressure.

The tie layer 122 is configured to adhere both to the metal layer 120 and the background layer 108. Further, the tie layer preferably adheres to the metal layer 120 at least as strongly as the tie layer 122 adheres to the background layer 108 when the heat transfer label 100 is applied to a substrate under heat and pressure.

In one embodiment, the tie layer 122 composition is comprised of about 66.5%, by weight, VMA vinyl resin (Shexian Sinfeng Chem Co Ltd), about 14.7%, by weight, SST-3 micronized Teflon (Shamrock Technologies, Inc., Newark, N.J.), about 13.7%, by weight, fumed silica (Cabot Corporation, Boston, Mass.), about 4.5%, by weight, 5160 plasticizer (Eastman Chemical Company, Kingsport, Tenn.) and about 0.7%, by weight, Foamex N defoamer (Tego Chemie Service GmbH, Essen, Germany). The above composition contains about 32.5%, by weight, solids and about 67.5%, by weight, VOCs.

To form the tie layer 122 in the preferred embodiment, the above described composition is screen printed onto a selected portion of the metal layer 120 through a stainless steel mesh screen with 270 lines per inch and allowed to dry. The dry thickness of the tie layer 122 in the preferred embodiment is about 0.0001" to 0.0003", but preferably about 0.0002".

The texture layer 124 is configured to adhere to the background layer 108 and separate from the metal layer 120 when the heat transfer label 100 is applied to a substrate under heat and pressure. In the preferred embodiment, the textured layer 124 composition comprises a UV curable ink, which is highly cross-linked when subjected to a UV source, as it was with the previously described embodiments.

To form the textured layer 124 in the preferred embodiment, the UV curable ink is screen printed onto a selected portion of the metal layer 120 according to a desired design. The printed UV curable ink is cured under a suitable UV source to form the textured portion 102 comprising a highly crossed-linked UV ink.

The background layer 108 is configured not to adhere to the metal layer 120, but adhere to the tie layer 122, the textured layer 124, and the substrate 106 to which the heat transfer label 100 is to be applied (for example, PETG cosmetic jars and painted graphite golf club shafts) when the heat transfer label 100 is applied to a substrate under heat and pressure.

In the preferred embodiment, background layer 108 composition is comprised of about 21.6%, by weight, LC-13/2 vinyl resin (Shexian Sinfeng Chem Co Ltd), about 4.6%, by weight, S160 plasticizer (Eastman Chemical Company, Kingsport, Tenn.), about 0.3%, by weight, Foamex N defoamer (Tego Chemie Service GmbH, Essen, Germany), about 1.4%, by weight, Cab-O-Sil silica aerogel (Cabot Corporation, Boston, Mass.), about 17.5%, by weight, pigment, about 47.2%, by weight, cyclohexanone solvent (commercially available from many sources), about 3.4%, by weight, dibasic ester solvent (commercially available from many sources) and about 4.1%, by weight, Aromatic 150 solvent (ExxonMobil Chemicals, Houston, Tex.). The above composition contains about 45.4%, by weight, solids and about 54.6%, by weight, VOCs.

It will be appreciated that the pigment used in the composition of the background layer 108 will vary depending upon the particular color(s) desired. For example, the pigment may comprise myriad combinations of any number of organic and inorganic pigments, including: titanium dioxide white pigment (commercially available from many sources), Irgazin Red DPP-BO, Cromophtal Scarlet RN, Irgalite Yellow LBG and Irgalite Blue LGLD colored organic pigments (all commercially available from Ciba Specialty Chemicals, Tarrytown, N.Y.), TiPure R960 white inorganic pigment (E. I. du Pont de Nemours and Company, Wilmington, Del.), Monarch M120 black inorganic pigment (Cabot Corporation, Boston, Mass.) and Bayferrox 318M iron oxide black pigment (Bayer AG, Germany). Those skilled in the art will appreciate that the preceding list of pigments identifies only a small fraction of the pigments that may be used to create a specific desired color of the background layer 108, and many different pigments and pigment combinations are possible, all of which are within the scope of the present invention.

To form the background layer 108 in the preferred embodiment, the above described composition is printed on top of the tie layer 122, the textured layer 124 and the portions of the metal layer 120 as shown in FIG. 5. The dry thickness of the background layer 108 in the preferred embodiment is about 0.0001" to 0.0003", but preferably about 0.0002".

To apply the heat transfer label 100 to the substrate 106, heat and pressure are applied to the outer surface 114 of the carrier 110 using conventional heat transfer equipment, such as, in the preferred embodiment, a Stamprite hot stamping machine (for applying the heat transfer label 100 to PETG jars) or a USI golf shaft machine (for applying the heat transfer label 100 to a painted graphite golf shaft).

As shown in FIG. 6, when heat and pressure are applied to the carrier 110 to apply the heat transfer label 100 to the substrate 106, the background layer 108 is separated from the metal layer 120 and adheres to the substrate 106. The tie layer 122 and the textured layer 124 remain bonded to the background layer 108 through the transfer step.

Because the tie layer 122 adheres to the background layer 108 more strongly than the protective layer 116 adheres to the release layer 112, and because the protective layer 116, the metallizable layer 118, the metal layer 120 and the tie layer 122 adhere more strongly to each than the protective layer 116 adheres to the release layer 122, as the background layer 108 separates from the release layer 112 after the application of heat and pressure to the label 100, only that portion of the metal layer 120 in contact with the tie layer 122 (and the complementary portions of the metallizable layer 118 and the protective layer 116) are transferred to the substrate 106 with the background layer 108. The remaining portions of the metal layer 120, the metallizable layer 118 and the protective layer 116 (those portions outside of the tie layer 122) are not transferred to the substrate 106 with the background layer 108 because the background layer 108 adheres to the substrate 106 more strongly than to the metal layer 120.

It should be understood that the particular compositions of the carrier 110, release layer 112, protective layer 116, metallizable layer 118, metal layer 120, tie layer 122, textured layer 124 and background layer 108 may vary from the specific compositions disclosed herein depending upon the composition of a substrate to which the label 100 is to be applied and the desired color of different portions of the label 110, as long as the background layer 108 separates from the metal layer 120 and adheres to the substrate, and the textured portion 102 and the metalized portion 104 remain bonded to the background layer 108 when the label 110 is applied on the substrate.

For example, the composition of the tie layer may be based on any number of base resins that adhere to aluminum (or any other metal chosen for the metal layer 120) and to the background layer 108. Similarly, the composition of the background layer 108 may be based on any number base thermoplastic resins that easily separates from aluminum (or another metal chosen for the metal layer 120), but adheres to the tie layer 122, the textured layer 124 and the particular substrate.

In general terms, most vinyl (other than VMA), acrylic, epoxy, phenoxy and chlorinated polyolefin (CPO) based resins will not adhere to the metal layer 120 but will adhere to a wide range of substrates, tie layer materials and UV curable inks for the textured layer 124. Thus, background layer 108 may be comprised of such resins. For example, using the LC-13/2-based composition of the background layer 108 in the preferred embodiment, in addition to PETG and painted graphite, the heat transfer label 100 may be applied to other substrates such as acrylonitrile butadiene styrene (ABS) plastic, polycarbonate (PC) plastic, styrene plastic and acrylic plastic.

In some embodiments, the protective layer and the metallizable layer can be two separate layers of the same material or formulation, as disclosed in the aforementioned patent to Colella et al., which is incorporated herein in its entirety by reference. Further, the metallized portion of the label may include a holographic image or holographic section.

Figure 7:
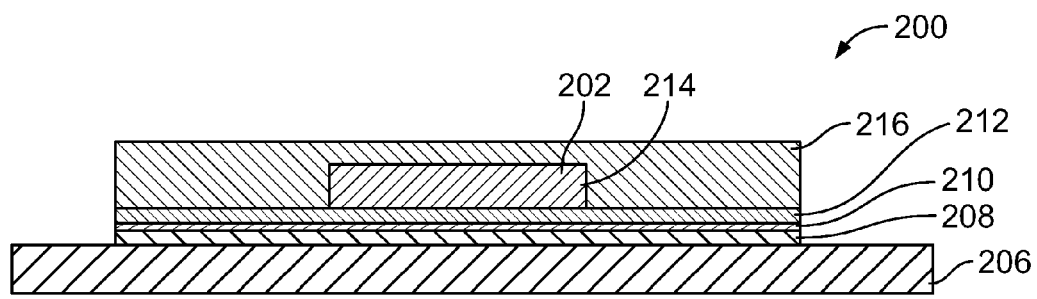
FIG. 7 is a schematic cross sectional view of a heat transfer label including a metallized textured portion according to yet another embodiment.
Figure 8:
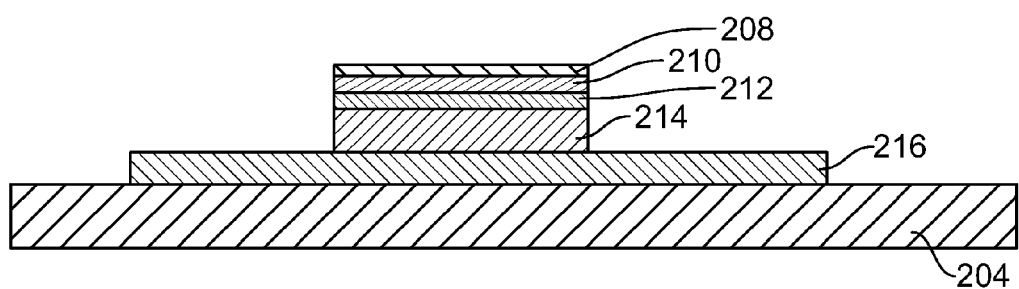
FIG. 8 is a schematic cross sectional view of the heat transfer label of FIG. 7 applied on a substrate.

FIG. 7 shows a schematic cross sectional view of an embodiment of a heat transfer label 200, which includes a metallized textured portion 202. FIG. 8 illustrates a schematic cross sectional view of the label 200 heat transferred to a substrate 204. Layer thicknesses of FIGS. 7 and 8 are exaggerated for easy understanding and are not proportional. The heat transfer label 200 generally includes a carrier 206, a protective layer 208, a metallizable layer 210, a metal layer 212, a textured layer 214, and a background layer 216. The details of the each layer are similar to the layers of the heat transfer label 100, thus will not be repeated. Only features unique to the embodiments of FIGS. 7 and 8 will be discussed further.

The protective layer 208, the metallizable layer 210 and the metal layer 212 are printed on the carrier 206. Although not shown, a release layer can be provided on the carrier 206 to facilitate a clean separation of the protective layer 208 in the metalized textured portion 202. The textured layer 214 is formed using a UV curable ink that adheres to the metal layer 212 when cured via a suitable UV source. The background layer 216 is printed on top of the metalized textured portion 202 and portions of the metal layer 212. The background layer 216 is formed using a thermoplastic ink that adheres to the substrate 204 and the textured layer 214 more strongly than to the metal layer 212 when subjected to heat and pressure, such that the background layer 216 transfers and bonds to the substrate 204 with the metalized textured portion 202.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A textured heat transfer label, comprising:
   a carrier;
   a textured layer on the carrier, the textured layer including a raised portion and an unprinted portion, wherein the unprinted portion defines a graphic pattern, the raised portion formed from a UV curable ink formulated from one or more of an epoxy, a polyurethane, a polymethacrylate, a polyethylene vinyl acetate, a polyvinyl chloride, a vinyl chloride/vinyl acetate copolymer, a functionalized vinyl chloride/vinyl acetate copolymer, and a chlorinated halogenated polyolefin; and
   a background layer disposed over the textured layer so as to extend across both the raised portion and the unprinted portion, wherein the UV curable ink is not present between the carrier and the background layer in the unprinted portion;
   wherein the background layer is configured to transfer and adhere to a substrate upon application of heat and pressure, and the textured layer is configured to remain bonded to the background layer providing a raised textured surface, wherein the background layer is configured to soften and become tacky when subjected to heat and pressure, wherein an adhesion between the background layer and the substrate is greater than an adhesion between the background layer and the carrier when subjected to heat and pressure.

2. A textured heat transfer label, comprising:
   a carrier;
   a textured layer on the carrier, the textured layer including a raised portion and an unprinted portion, wherein the unprinted portion defines a graphic pattern, the raised portion formed from a UV curable ink formulated from one or more of an epoxy, a polyurethane, a polymethacrylate, a polyethylene vinyl acetate, a polyvinyl chloride, a vinyl chloride/vinyl acetate copolymer, a functionalized vinyl chloride/vinyl acetate copolymer, and a chlorinated halogenated polyolefin; and
   a background layer disposed over the textured layer so as to extend across both the raised portion and the unprinted portion, wherein the UV curable ink is not present between the carrier and the background layer in the unprinted portion;
   wherein the background layer is configured to transfer and adhere to a substrate upon application of heat and pressure, and the textured layer is configured to remain bonded to the background layer providing a raised textured surface, wherein the background layer is formed from a thermoplastic ink, and
   wherein an adhesion between the textured layer and the background layer is greater than an adhesion between the textured layer and the carrier when subjected to heat and pressure.

3. The textured heat transfer label of claim 1, wherein the raised portion is defined by a strip of printed area including the unprinted portion defining the graphic pattern.

4. The texture heat transfer label of claim 1, wherein the background layer is printed over the textured layer on the carrier.

5. The textured heat transfer label of claim 1, wherein an adhesion between the textured layer and the background layer is greater than an adhesion between the textured layer and the carrier when subjected to heat and pressure.

6. The texture heat transfer label of claim 1, wherein the carrier includes a release layer, wherein the textured layer and the background layer are applied on the release layer.

7. A method of making a textured heat transfer label, comprising steps of:
   printing a textured layer including a raised portion and an unprinted portion on a carrier, wherein printing the textured layer includes printing a strip of a UV curable ink defining the unprinted portion, wherein the raised portion is defined by the strip of UV curable ink on the carrier, and a graphic pattern is defined by the unprinted portion in the strip of UV curable ink the UV curable ink formulated from one or more of an epoxy, a polyurethane, a polymethacrylate, a polyethylene vinyl acetate, a polyvinyl chloride, a vinyl chloride/vinyl acetate copolymer, a functionalized vinyl chloride/vinyl acetate copolymer, and a chlorinated halogenated polyolefin;
   curing the textured layer; and
   printing a background layer over the cured textured layer on the carrier so as to extend across both the raised portion and the unprinted portion, wherein the UV curable ink is not present between the carrier and the background layer in the unprinted portion.

8. The method of claim 7, wherein printing the textured layer includes applying multiple passes of a UV curable ink to achieve a desired height of the raised portion.

9. The method of claim 7, wherein curing the textured layer comprises exposing the printed textured layer to a UV energy source.

* * * * *